United States Patent
Jia et al.

(10) Patent No.: US 11,197,279 B1
(45) Date of Patent: Dec. 7, 2021

(54) METHOD AND AN APPARATUS FOR PHYSICAL UPLINK CONTROL CHANNEL (PUCCH) DISCONTINUOUS TRANSMISSION (DTX) DETERMINATION IN A WIRELESS COMMUNICATION SYSTEM

(71) Applicant: Hong Kong Applied Science And Technology Research Institute Co., Ltd., Shatin (HK)

(72) Inventors: Kanghao Jia, Tai Po (HK); Yuxian Zhang, Tai Po (HK); Man Wai Kwan, Shatin (HK); Kong Chau Tsang, Kowloon (HK)

(73) Assignee: Hong Kong Applied Science and Technology Research Institute Company Limited, Shatin (HK)

( * ) Notice: Subject to any disclaimer, the term of this patent is extended or adjusted under 35 U.S.C. 154(b) by 16 days.

(21) Appl. No.: 16/922,150

(22) Filed: Jul. 7, 2020

(51) Int. Cl.
*H04W 72/04* (2009.01)
*H04W 24/02* (2009.01)
*H04W 76/28* (2018.01)

(52) U.S. Cl.
CPC ....... *H04W 72/0413* (2013.01); *H04W 24/02* (2013.01); *H04W 76/28* (2018.02)

(58) Field of Classification Search
CPC .. H04W 72/0413; H04W 24/02; H04W 76/28
USPC .......................................................... 370/329
See application file for complete search history.

(56) References Cited

U.S. PATENT DOCUMENTS

| 8,315,185 | B2 | 11/2012 | Chan |
| 8,850,285 | B2 | 9/2014 | Liu et al. |
| 9,125,161 | B2* | 9/2015 | Baldemair ............ H04L 1/1812 |
| 2011/0274024 | A1* | 11/2011 | Liu .......................... H04B 1/69 |
| | | | 370/311 |
| 2013/0022017 | A1* | 1/2013 | Han ..................... H04L 27/2636 |
| | | | 370/329 |
| 2013/0286996 | A1 | 10/2013 | Takeda et al. |
| 2015/0229427 | A1 | 8/2015 | Wang |
| 2016/0295561 | A1 | 10/2016 | Papasakellariou |

(Continued)

FOREIGN PATENT DOCUMENTS

| CN | 102740316 B | 10/2012 |
| CN | 103369655 B | 10/2013 |

(Continued)

OTHER PUBLICATIONS

ZTE Corp.; "Discussion on DTX and HARQ"; 3GPP TSG-RAN2 Meeting #94 R2-163861; May 27, 2016.

(Continued)

*Primary Examiner* — Inder P Mehra (57) ABSTRACT

Described is a method and apparatus for processing an uplink (UL) signal at a Physical Uplink Control Channel (PUCCH) in a wireless communication system to determine a discontinuous transmission (DTX) state. The method comprises receiving a UL channel signal at a PUCCH receiver apparatus and, after resource element (RE) demapping of said received UL channel signal in said PUCCH receiver apparatus, normalizing a signal power of at least one signal element or resource. The normalized power is compared to a selected, calculated or predetermined threshold and, based on said comparison, a determination is made on whether or not a DTX state has occurred.

16 Claims, 8 Drawing Sheets

(56) References Cited

U.S. PATENT DOCUMENTS

| | | | | |
|---|---|---|---|---|
| 2020/0221401 A1* | 7/2020 | Zhu | ................... | H04W 76/27 |
| 2020/0295813 A1* | 9/2020 | Rahman | .............. | H04W 52/225 |
| 2020/0314708 A1* | 10/2020 | Jassal | ................ | H04W 36/0072 |
| 2021/0234739 A1* | 7/2021 | Matsumura | .......... | H04B 17/345 |

FOREIGN PATENT DOCUMENTS

| | | |
|---|---|---|
| CN | 104283821 A | 1/2015 |
| CN | 104467992 B | 3/2015 |
| CN | 105262568 A | 1/2016 |
| CN | 105491591 A | 4/2016 |
| CN | 105873120 A | 8/2016 |

OTHER PUBLICATIONS

International Search Report and Written Opinion; PCT/CN2020/101212; dated Apr. 8, 2021.

\* cited by examiner

| PUCCH Format | UCI | Orthogonal Code Division Multiplexing | Transform Precoding |
| :---: | :---: | :---: | :---: |
| A | B | C | D |
| format 1/1a/1b | ACK/NACK or SR | Yes | No |
| format 2/2a/2b | ACK/NACK or CSI | Yes | No |
| format 3 | ACK/NACK or SR | Yes | Yes |
| format 0 | ACK/NACK or SR | Yes | No |
| format 1 | ACK/NACK or SR | Yes | No |
| format 2 | ACK/NACK or SR or CSI | No | No |
| format 3 | ACK/NACK or SR or CSI | No | Yes |
| format 4 | ACK/NACK or SR or CSI | Yes | Yes |

LTE: format 1/1a/1b, format 2/2a/2b, format 3

5G NR: format 0, format 1, format 2, format 3, format 4

METHOD AND AN APPARATUS FOR PHYSICAL UPLINK CONTROL CHANNEL (PUCCH) DISCONTINUOUS TRANSMISSION (DTX) DETERMINATION IN A WIRELESS COMMUNICATION SYSTEM

FIELD OF THE INVENTION

The invention relates particularly, but not exclusively, to a method and an apparatus for determining discontinuous transmission (DTX) when the Physical Uplink Control Channel (PUCCH) carries the uplink (UL) control information (UCI) from a user equipment (UE) to a base station (BS) in a wireless communications system.

BACKGROUND OF THE INVENTION

In conventional wireless communications systems such as long-term evolution (LTE) communications systems and 5G New Radio (NR) communications systems, a data payload in a downlink (DL) is carried by transport blocks which are encoded into codewords which are sent over a DL physical data channel called the Physical Downlink Shared Channel (PDSCH). The scheduling information of the PDSCH codeword(s), including its resource allocation in the subframe and its modulation and coding scheme, is included in the physical control channel, called the Physical Downlink Control Channel (PDCCH). Generally, the receiving UE decodes the messages in PDCCH and, where it finds that a PDSCH has been assigned to it, it decodes the PDSCH codeword(s) according to the scheduling information decoded from the PDCCH.

In order to prevent the loss of transport blocks, LTE and 5G NR use similar but not identical Hybrid Automatic Repeat Request (HARQ) schemes for most but not all of their respective signal formats. Where a HARQ scheme is implemented, then, in the physical layer of the radio access network (RAN), comprising the Evolved Universal Mobile Telecommunications System (UMTS) Terrestrial Radio Access Network (E-UTRAN) in LTE and the 5G Next Generation Radio Access Network (5G NG-RAN) in 5G NR, HARQ is implemented both in the UL and the DL. The hybrid automatic repeat request acknowledgement is denoted as HARQ-ACK.

HARQ-ACK may be transmitted by the UE in response to certain PDSCH transmissions and includes one or several acknowledgements, either positive (ACK) or negative (NACK) in response to transport blocks transmitted in the DL. HARQ-ACK may be transmitted on one of the physical channels such as the Physical Uplink Control Channel (PUCCH) or the Physical Uplink Shared Channel (PUSCH).

The present invention addresses the situation where the PUCCH carries the UCI from a UE to a BS and is applicable to LTE, 5G NR and future wireless communication systems exhibiting similar UL channel characteristics. The UCI may include ACK/NACK signals, Channel State Information (CSI) and/or Scheduling Request (SR) information.

Referring now to LTE by way of example, if the BS (eNodeB) detects ACK instead of DTX, a so called ACK false detection, the BS will erroneously consider the corresponding DL transport block as correctly received. Since the transport block has not been correctly received by the UE, corresponding data will not be passed to the Medium Access Control (MAC) layer and from the MAC layer to the Radio Link Control (RLC) layer. Data will hence be missing in the RLC layer. This will cause HARQ retransmissions in the RLC layer which introduce delay and possibly large retransmissions which is very undesirable. Also, if a NACK is detected erroneously that in reality is DTX, the BS will retransmit the packet in such a way that the UE will not be capable of decoding it.

As already indicated, a problem arises when the UE is not aware of the presence of the PDSCH assigned to it if it fails to decode the PDCCH successfully. In this case the UE will not detect any DL payload data related control signaling and will not generate any ACK/NACK, CSI and/or SR information for UL transmission on the PUCCH. This situation has been well recognized and constitutes DTX, that is, neither an ACK nor a NACK signal is transmitted on the UL to the BS. Since the BS has no prior knowledge of whether the UE has failed to detect the PDCCH, it expects or deems that the symbols of the predetermined positions are ACK/NACK symbols and extracts them for the BS decoder to decode. If the BS disregards the possibility of DTX, either an ACK or NACK message will be returned by the decoder to a higher layer upon the decoding of the extracted symbols, which are, in fact, conveying no information. In general, both ACK and NACK messages are equally likely to be returned.

The consequence of wrongly detecting a DTX as an ACK is more deleterious to the system performance than wrongly detecting a DTX as a NACK.

Similarly, in 5G NR wireless communication systems, ACK or NACK (AN) signals may be used to indicate whether the signal is received successfully or not by the UE and whether the BS needs to retransmit the data. If the UE misses a DL control signal, the UE may encounter DTX and the UE will not send any message back to the BS. However, the BS needs to detect one of three possible feedback states, i.e. ACK, NACK or DTX, for rearranging a next transmission to the UE.

Figure 1:
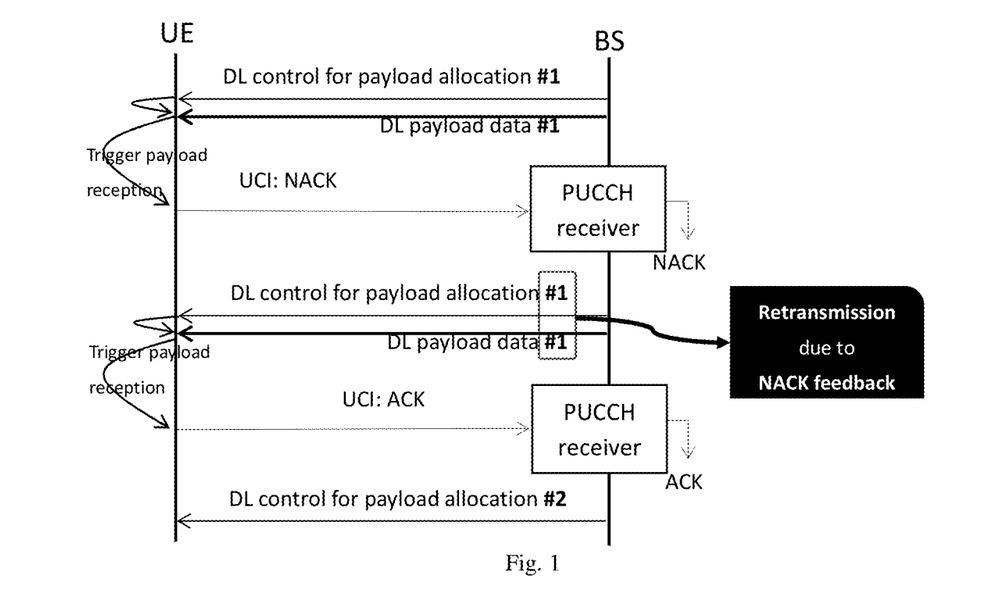
FIG. 1 is a signal diagram illustrating message exchanges between a BS and a UE for retransmission of control data and payload data.

FIG. 1 illustrates a method by which UL signals from the UE to the BS control transmission of payload control data and payload data on the DL from the BS to the UE. In the example of FIG. 1, it can be seen that, in response to a first "DL control for payload allocation #1" message from the BS to the UE, the UE, in this instance, responds with a "NACK" message. The NACK message is received by the PUCCH receiver apparatus at the BS and, as a consequence, the BS is configured to retransmit to the UE the first "DL control for payload allocation #1" message and its associated first "DL payload data #1" message. In this example, the UE then returns an "ACK" message to the PUCCH receiver apparatus at the BS in response to the retransmitted DL signal message and, as a consequence, the BS is configured to then transmit to the UE the second "DL control for payload allocation #2" message and its associated second "DL payload data #2" message (not shown in FIG. 1). FIG. 1 therefore illustrates how data is retransmitted by the BS to the UE when the UE initially indicates that it has not successfully received a DL payload data.

Figure 2:
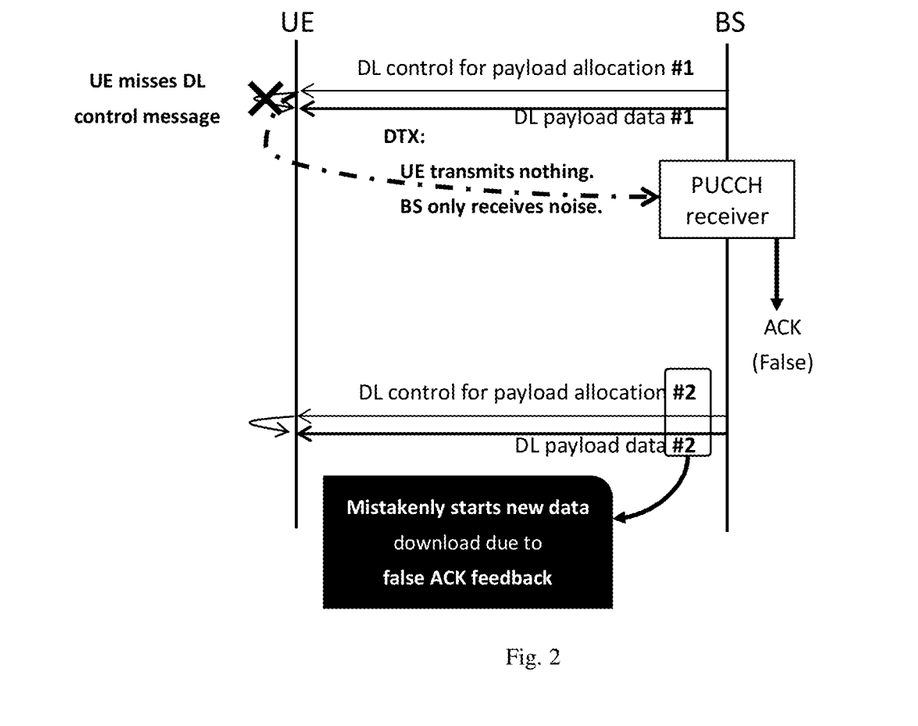
FIG. 2 is a signal diagram illustrating errant transmission of control data and payload data from a BS to a UE when a PUCCH receiver apparatus at the BS determines a false ACK message.

In contrast, FIG. 2 illustrates what may happen when the UE misses a DL data control message. In this example, the UE has missed the first "DL control for payload allocation #1" message and is then not aware to decode the first "DL payload data #1" message. As a consequence, the UE sends no ACK/NACK message back to the BS in response. This scenario represents a DTX state. The PUCCH receiver apparatus at the BS only receives a noise signal but processes this as though it comprises a UL UCI signal with the result that, in this example, the PUCCH receiver apparatus falsely detects or determines receipt of an ACK/NACK message from the UE and thus outputs a false ACK message. This causes the BS to commence a new control and payload data transmission in response to the false ACK message, e.g.

"DL control for payload allocation #2", etc. It is clear from the example of FIG. 2 that there is considerable room for improvement in determining DTX at the PUCCH receiver apparatus.

Figure 3:
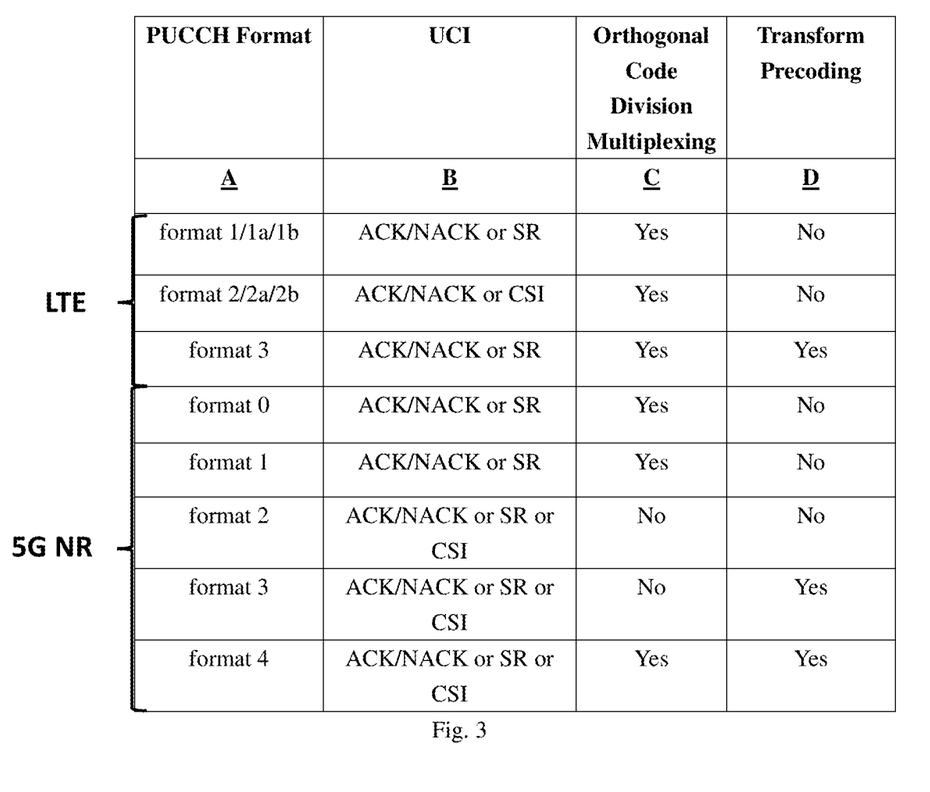
FIG. 3 identifies LTE and 5G NR PUCCH Formats relevant to the present invention and UCI information associated with said signal formats.

In FIG. 3, information is provided on the type of UCI associated with different LTE and 5G NR PUCCH Formats. Column A of FIG. 3 identifies the different LTE and 5G NR PUCCH Formats relevant to the present invention. Column B of FIG. 3 identifies the type of UCI that could be contained in each PUCCH Format. Column C identifies if an uplink PUCCH signal of a selected signal format requires orthogonal code division multiplexing (OCDM) in the UE transmitter and therefore requires de-spreading in the PUCCH receiver apparatus of the BS. Column D identifies if an uplink PUCCH signal of a selected signal format requires transform precoding in the UE transmitter and therefore requires Inverse Discrete Fourier Transform (IDFT) in the PUCCH receiver apparatus of the BS. By way of example, it will be seen that LTE PUCCH Format 3 requires OCDM in the UE transmitter and de-spreading in the PUCCH receiver apparatus of the BS and requires transform precoding in the UE transmitter and IDFT in the PUCCH receiver apparatus of the BS. LTE PUCCH Formats 1/1a/1b require only OCDM in the UE transmitter and de-spreading in the PUCCH receiver apparatus of the BS but do not require transform precoding in the UE transmitter and IDFT in the PUCCH receiver apparatus. In contrast, NR PUCCH Format 2 requires neither of the foregoing.

Figure 4:
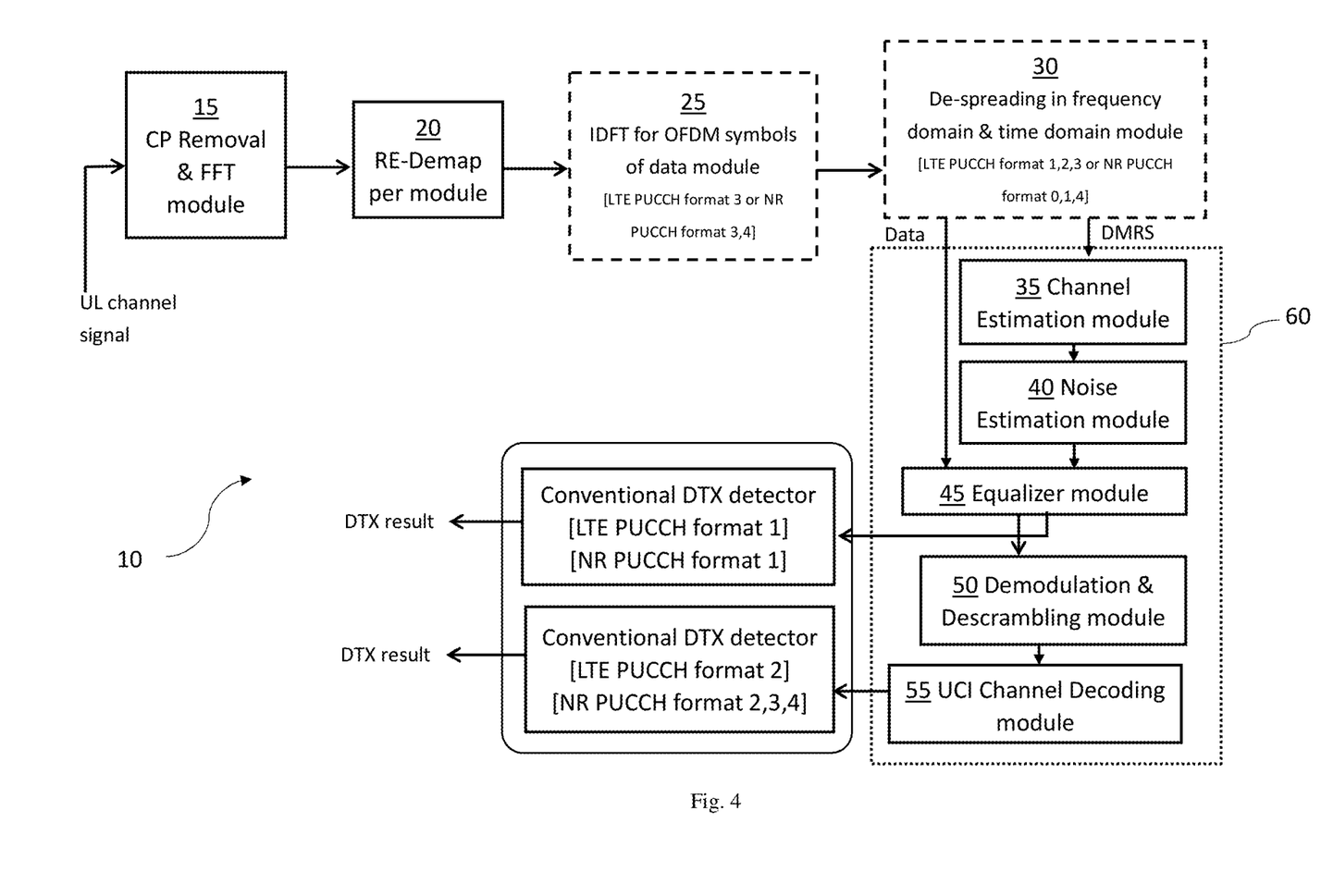
FIG. 4 is a schematic diagram showing a conventional PUCCH receiver apparatus for a wireless communications system.

In a conventional PUCCH receiver apparatus 10 as illustrated by FIG. 4, a received UL channel signal will first be processed in a cyclic prefix (CP) removal and fast Fourier transform (FFT) module 15, although it will be understood that, in some conventional PUCCH receiver apparatuses, CP removal and FFT processing may be performed by separate modules rather than a combined module. The received signal is then further processed by a resource element (RE) demapper module 20. After RE demapping, the signal, if comprising some specified LTE and 5G NR PUCCH Formats as shown in FIG. 4, is subject to inverse transform precoding of the orthogonal frequency-division multiplexing (OFDM) symbols in an Inverse Discrete Fourier Transform (IDFT) module 25. The IDFT module 25 is shown in dashed line in FIG. 4 to signify that it is not required for all LTE and 5G NR PUCCH Formats. The signal, if comprising some other specified LTE and 5G NR PUCCH Formats as shown in FIG. 4, is subject to signal de-spreading in a signal de-spreading module 30. The signal de-spreading module 30 is also shown in dashed line in FIG. 4 to signify that it is also not required for all LTE and 5G NR PUCCH Formats. The signal is de-spread in frequency domain and time domain. The resulting data signal is then processed in an equalizer module 45. The demodulation reference signal (DMRS) will also be processed in the equalizer module 45 but after having been separately subjected to a channel estimation process in a channel estimation module 35 and a noise estimation process in a noise estimation module 40. The resulting data signal and the DMRS data, after being processed in the equalizer module 45, will be subjected to demodulation and descrambling in a demodulation and descrambling module 50 and then finally processed in a UCI channel decoding stage or module 55 to generate UCI data.

The modules of the conventional PUCCH receiver apparatus 10 of FIG. 4 enclosed by the dashed line box 60 comprise the UCI data detection modules of the PUCCH receiver apparatus 10.

In the conventional PUCCH receiver apparatus 10 of FIG. 4, detection or determination of DTX for LTE PUCCH Format 1 and 5G NR PUCCH Format 1 occurs after signal equalization in the equalizer module 45. Detection or determination of DTX for LTE PUCCH Format 2 and 5G NR PUCCH Formats 2, 3 and 4 occurs even later after channel decoding in the channel decoding module 55.

As indicated, the conventional DTX detection algorithms in both LTE and 5G NR systems are performed either after equalization or after channel decoding depending on the type of the LTE or 5G NR PUCCH Format. Performing the process of determining DTX after equalization or after channel decoding causes unnecessary latency in UL channel signal processing, especially for NR Ultra-reliable low-latency communication (URLLC) applications. Furthermore, it adds undesirable latency in the detection or determination of DTX and constitutes a waste of the signal processing resources of the equalizer module 45 and the channel decoding module 55.

CN104467992 discloses a DTX detection method for an LTE system PUCCH including the steps that: a time delay power spectrum corresponding to a subframe is transmitted so as to calculate all spreading code blocks; each spreading code block is a set of users using the same spreading code; time delay power values of all the users are extracted from the time delay power spectrum; and a peak detection threshold is calculated according to the time delay power values of the users and an obtained relative threshold value; DTX detection is carried out on all the users according to a peak detection threshold. This references teaches that the distribution characteristics of the time delay power spectrum corresponding to the data symbols and the time delay power spectrum corresponding to the pilot symbols are normalized to obtain the corresponding normalized time delay power spectrum, but normalized by the number of OFDM symbols not noise variance in a specific antenna.

CN103369655 discloses a method for improving LTE PUCCH DTX detection performance. The method includes the steps that firstly NI flattening treatment among time slots and antennas is conducted on UE equilibrium demodulation data, then DTX detection and PUCCH demodulation treatment is conducted. This reference teaches that the current UE corresponding data crossing DTX thresholding after adjudicating DTX carries out equilibrium merging, i.e. carries out data balancing merging treatment between time slots, and between antennas but this method cannot be applied to 5G NR PUCCH Formats.

US2015/0229427 discloses a method of noise power estimation for PUCCH Format 1/1a/1b in an LTE system which comprises: determining at least one unused orthogonal cover code, OCC for data symbols and reference symbols in the PUCCH, and estimating noise power by employing the at least one unused OCC, for Signal-Noise Ratio, SNR, calculation and DTX detection. This reference does not consider using a spreading factor in both frequency domain and time domain.

CN105873120 discloses a method and a device for detecting a Physical Uplink Control Channel (PUCCH). The method comprises steps: a base station calculates a pilot symbol cross-correlation value and a data symbol cross-correlation value on each receiving antenna in the current subframe; when an antenna selection function is enabled, as for each receiving antenna, a corresponding energy value is calculated according to the pilot symbol cross-correlation value of the receiving antenna; by using the maximum value in the energy values and a preset scaling factor, the current effective decision threshold is determined; and according to the effective decision threshold and the energy value of each receiving antenna, whether effective data exist on each receiving antenna is determined, and by using the pilot symbol cross-correlation value and the data symbol cross-correlation value on the receiving antenna with effective data, according to a discontinuous transmission (DTX) decision threshold matched with the number of receiving antennas with effective data, PUCCH performance detection on the current subframe is carried out. This method cannot be applied to 5G NR PUCCH Formats 0, 2, 3, 4. In any event, it is not optimal to consider DTX detection separately in each receive antenna. Furthermore, the threshold is restricted such that the method cannot process signals with different power scaling.

CN105262568 relates to ACK/NACK and DTX detection in a wireless communication system where the DTX status threshold is calculated based on the statistics of signal-to-noise ratio (SNR). However, it can be challenging to obtain accurate noise estimations. This method introduces high computational complexity to use maximum likelihood (ML) detection for UCI bits before DTX detection, especially for large numbers of UCI bits.

CN104283821 discloses a DTX detecting method where a reference signal is used for conducting channel estimation, the equivalent signal to noise ratio is structured through a channel estimation result, and DTX judgment is conducted based on the signal to noise ratio. However, it is not appropriate to combine estimated channel signals of different antennas. Furthermore, determining noise power based on time domain channel coefficients is not accurate if channel statistics are not available. Moreover, the method cannot be applied to PUCCH with a large number of RBs under a frequency selective fading channel.

CN102740316 relates to a method for detecting a UL DTX state. The method comprises receiving data information from UL user equipment of the current cell; calculating a confidence value corresponding to the data information, wherein the confidence value is used for reflecting the accuracy of data information decoding carried out by a receiving terminal; comparing the confidence value with a preset DTX judgment threshold; and determining whether the UL user equipment is in the DTX state or not according to a comparative result. Here, the preset DTX judgment threshold must change for different channel conditions and thus determination of the DTX judgment threshold requires considerable computational effort.

U.S. Pat. No. 8,850,285 relates to ACK/NACK/DTX detection in a wireless communication system disclosing a channel decoding block which receives a signal from the UE and produces a decoded ACK/NACK information vector.

U.S. Pat. No. 8,315,185 relates to ACK/NACK detection in an LTE wireless communication system. The ACK/NACK detector has a soft decoder and decision-maker. A threshold value is used to determine whether the transmitted signal from the UE contains an ACK/NACK transmission when the threshold value is met. If the threshold value is not met, the transmission is determined to be DTX. The threshold value is based on a power estimate of soft data bits.

What is desired is a method for determining DTX more accurately, more efficiently and/or with less signal processing latency in wireless communication systems.

Objects of the Invention

An object of the invention is to mitigate or obviate to some degree one or more problems associated with known methods of determining DTX in wireless communication systems.

The above object is met by the combination of features of the main claims; the sub-claims disclose further advantageous embodiments of the invention.

Another object of the invention is to provide a generic DTX detection method for different PUCCH Formats for both of at least LTE and 5G NR systems in which the BS can make early and efficient DTX detection.

Another object of the invention is to provide a generic DTX detection method for different PUCCH Formats for both of at least LTE and 5G NR systems in which the BS is not required to implement the whole conventional DTX detection process or UCI data acquisition process.

Another object of the invention is to provide an improved PUCCH receiver apparatus for DTX determination.

One skilled in the art will derive from the following description other objects of the invention. Therefore, the foregoing statements of object are not exhaustive and serve merely to illustrate some of the many objects of the present invention.

SUMMARY OF THE INVENTION

The invention concerns a method and an apparatus for processing an uplink (UL) signal at a Physical Uplink Control Channel (PUCCH) in a wireless communication system to determine a discontinuous transmission (DTX) state. The method comprises receiving a UL channel signal at a PUCCH receiver apparatus and, after resource element (RE) demapping of said received UL channel signal in said PUCCH receiver apparatus, normalizing a signal power of at least one signal element or resource. The normalized power is compared to a selected, calculated or predetermined threshold and, based on said comparison, a determination is made on whether or not a DTX state has occurred.

The summary of the invention does not necessarily disclose all the features essential for defining the invention; the invention may reside in a sub-combination of the disclosed features.

The forgoing has outlined fairly broadly the features of the present invention in order that the detailed description of the invention which follows may be better understood. Additional features and advantages of the invention will be described hereinafter which form the subject of the claims of the invention. It will be appreciated by those skilled in the art that the conception and specific embodiment disclosed may be readily utilized as a basis for modifying or designing other structures for carrying out the same purposes of the invention.

BRIEF DESCRIPTION OF THE DRAWINGS

The foregoing and further features of the present invention will be apparent from the following description of preferred embodiments which are provided by way of example only in connection with the accompanying figures, of which.

DESCRIPTION OF PREFERRED EMBODIMENTS

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

It should be understood that the elements shown in the FIGS, may be implemented in various forms of hardware, software or combinations thereof. These elements may be implemented in a combination of hardware and software on one or more appropriately programmed general-purpose devices, which may include a processor, memory and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of systems and devices embodying the principles of the invention.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

The invention relates to a generic DTX detection or determination method for different PUCCH Formats for both of at least LTE and 5G NR communications systems in which the BS can make early and efficient DTX detection without needing to implement the whole conventional DTX detection process or complete the UCI data acquisition process. The BS needs to have a DTX determination capability to be able to distinguish DTX from normal transmission.

Figure 5:
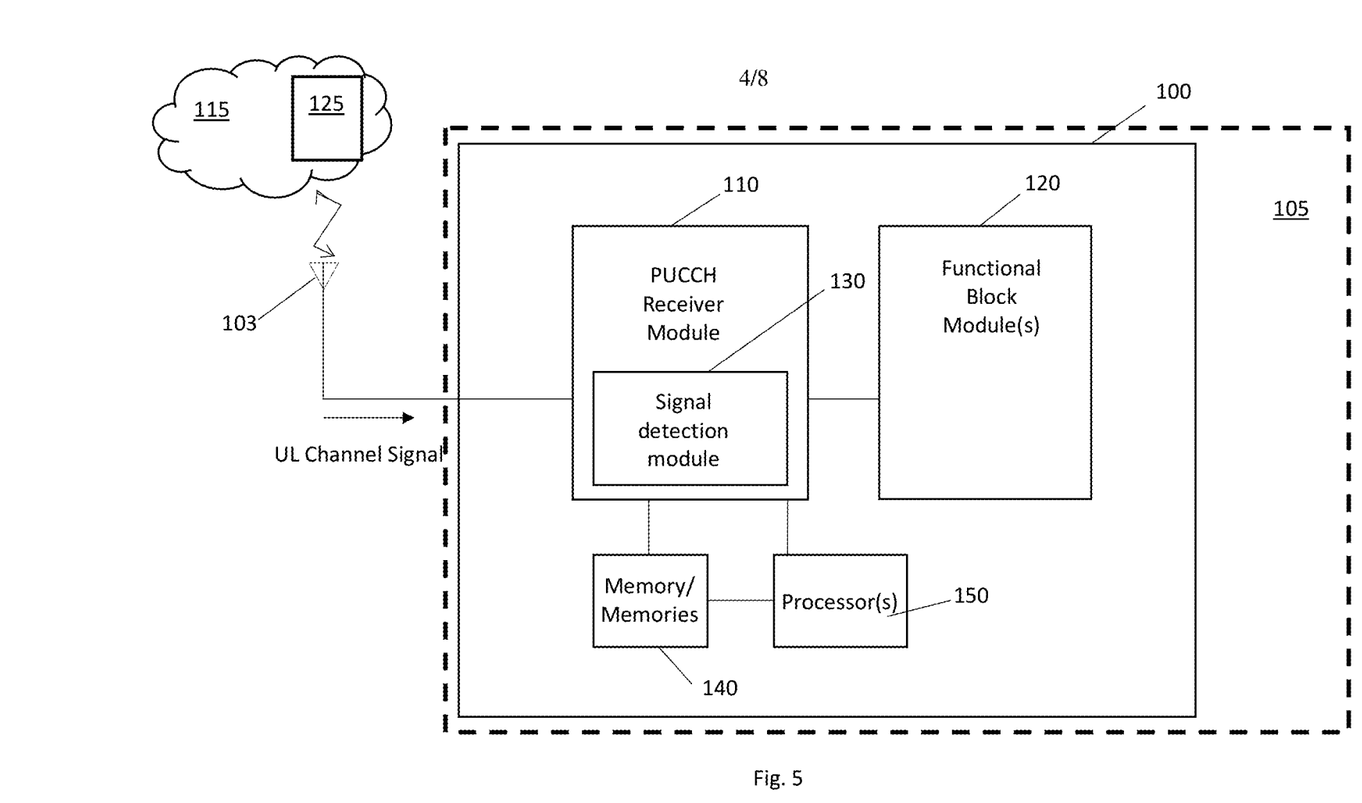
FIG. 5 is a block schematic diagram of an embodiment of a PUCCH receiver apparatus in accordance with the invention.

FIG. 5 shows an exemplary embodiment of an improved PUCCH receiver apparatus 100 for a BS in accordance with concepts of the present invention. In the illustrated embodiment, the PUCCH receiver apparatus 100 may comprise communication equipment such as a network node, a network card, or a network circuit communicatively connected to or forming part of a BS 105 (denoted by dashed-line box in FIG. 5), etc. operating in any of an LTE or 5G NR communications system environment 115 or a communications system environment exhibiting similar UL channel characteristics to an LTE or 5G NR communications system. The BS 105 communicates with one or more UEs 125 located within its cell area.

The PUCCH receiver apparatus 100 may comprise a plurality of functional blocks for performing various functions thereof. For example, the PUCCH receiver apparatus 100 includes PUCCH receiver module 110 providing received signal processing and configured to provide received signals and/or information extracted therefrom to functional block module(s) 120 such as may comprise various data sink, control element(s), user interface(s), etc. Although PUCCH receiver module 110 is described as providing received signal processing, it will be appreciated that this functional block may be implemented as a transceiver providing both transmitted and received signal processing. Irrespective of the particular configuration of PUCCH receiver module 110, embodiments include signal detection module 130 disposed in association with the PUCCH receiver module 110 for facilitating accurate processing and/or decoding of a received channel signal in accordance with the invention. Channel signals may be received via an antenna module 103.

Although the signal detection module 130 is shown as being deployed as part of the PUCCH receiver module 110 (e.g. comprising a portion of the PUCCH receiver module control and logic circuits), there is no limitation to such a deployment configuration according to the concepts of the invention. For example, the signal detection module 130 may be deployed as a functional block of PUCCH receiver apparatus 100 that is distinct from, but connected to, PUCCH receiver module 110. The signal detection module 130 may, for example, be implemented using logic circuits and/or executable code/machine readable instructions stored in a memory 140 of the PUCCH receiver apparatus 100 for execution by a processor 150 to thereby perform functions as described herein. For example, the executable code/machine readable instructions may be stored in one or more memories 140 (e.g. random access memory (RAM), read only memory (ROM), flash memory, magnetic memory, optical memory or the like) suitable for storing one or more instruction sets (e.g. application software, firmware, operating system, applets, and/or the like), data (e.g. configuration parameters, operating parameters and/or thresholds, collected data, processed data, and/or the like), etc. The one or more memories 140 may comprise processor-readable memories for use with respect to one or more processors 150 operable to execute code segments of signal detection module 130 and/or utilize data provided thereby to perform functions of the signal detection module 130 as described herein. Additionally, or alternatively, the signal detection module 130 may comprise one or more special purpose processors (e.g. application specific integrated circuit (ASIC), field programmable gate array (FPGA), graphics processing unit (GPU), and/or the like) configured to perform functions of the signal detection module 130 as described herein.

Figure 6:
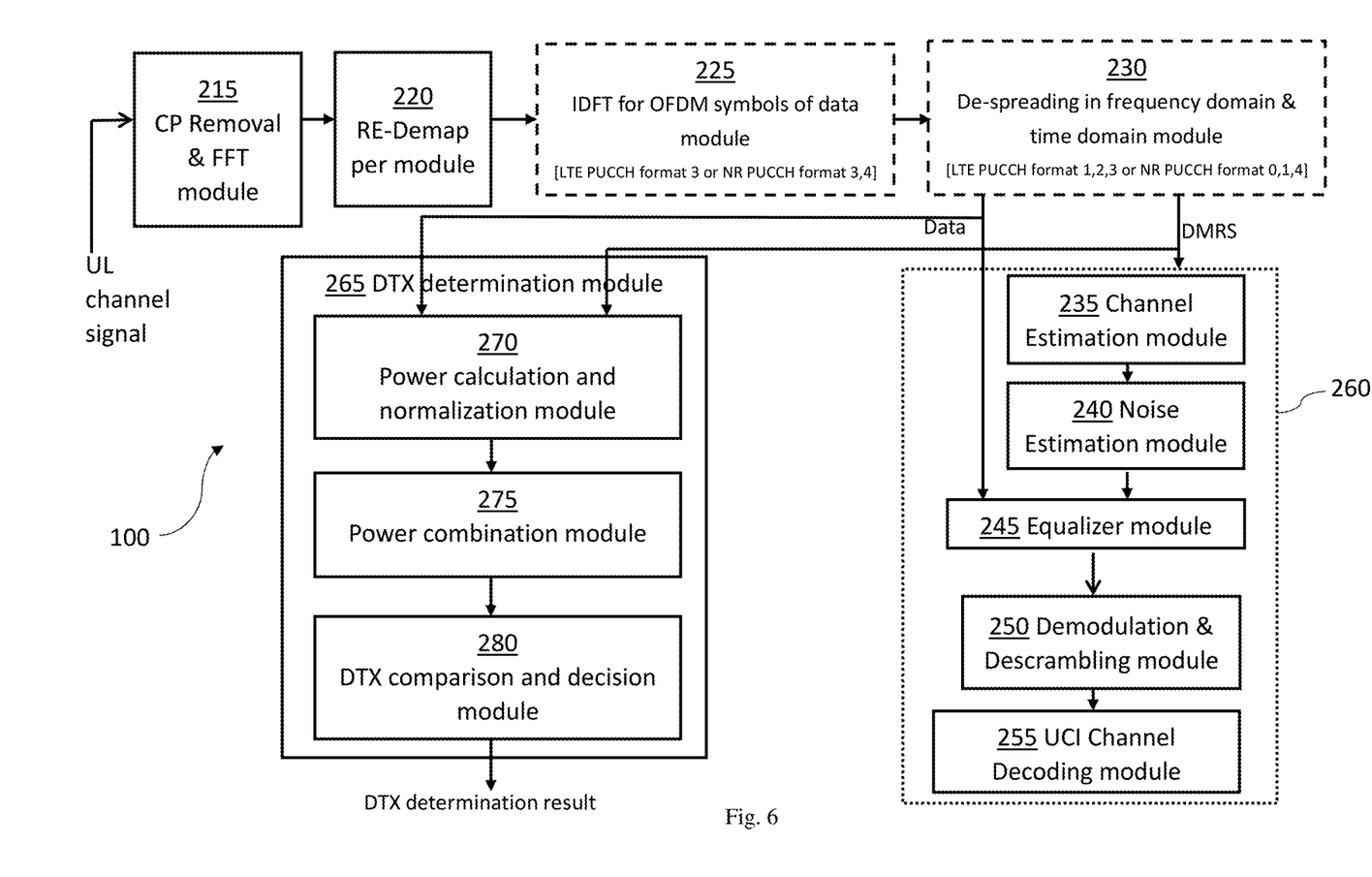
FIG. 6 is a block schematic diagram of the PUCCH receiver apparatus of FIG. 5 comprising a combination of connected functional modules.

FIG. 6 schematically illustrates the improved PUCCH receiver apparatus 100 implemented as a combination of connected functional modules of the kind comprising the conventional PUCCH receiver apparatus 10 of FIG. 4 where like modules in FIG. 6 to those of the conventional PUCCH receiver apparatus 10 of FIG. 4 are denoted by the same numerals but preceded by the numeral '2'. It will be understood that the functional modules of FIG. 6 could be implemented by any one or any combination of the PUCCH receiver module 110, signal detection module 130 and/or the functional block modules 120 of the apparatus 100 of FIG. 5.

The improved PUCCH receiver apparatus 100 of FIG. 6 comprises a CP removal and fast Fourier transform (FFT) module 215, an RE demapper module 220, an IDFT module 225 but only if required for some specified LTE and 5G NR PUCCH Formats, a signal de-spreading module 230 but also only if required for some specified LTE and 5G NR PUCCH Formats, a channel estimation module 235, a noise estimation module 240, an equalizer module 245, a demodulation and descrambling module 250 and a UCI channel decoding stage or module 255. The channel estimation module 235, the noise estimation module 240, the equalizer module 245, the demodulation and descrambling module 250 and the UCI channel decoding stage or module 255 comprise the UCI data detection modules 260 of the PUCCH receiver apparatus 100.

In contrast to the conventional PUCCH receiver apparatus 10 of FIG. 4, the PUCCH receiver apparatus 100 in accordance with the invention extracts, as shown in FIG. 6, the UL channel signal after it has been processed in the RE demapper module 220 but prior to UCI data detection in the UCI data detection modules 260 and, more specifically, prior to equalization in the equalizer module 245. The PUCCH receiver apparatus 100 is configured to firstly normalize a signal power of at least one signal element or resource of the RE demapped UL channel signal. A DTX determination module 265 comprising a power calculation and normalization module 270, a power combination module 275 (for some but not embodiments), and a DTX comparison and decision module 280 is provided to process the RE demapped UL channel signal. A power calculation and normalization module 270 is provided for calculating the power of the at least one signal element or resource and normalizing the power of said at least one signal element or resource. As such, the RE demapped UL channel signal is diverted to an input of this module 270. The normalized signal power of said at least one signal element or resource is compared to a selected, calculated or predetermined threshold $\delta$ in the DTX comparison and decision module 280 and, based on said comparison, the DTX comparison and decision module 280 makes a determination of whether or not a DTX state has occurred on the UL between the UE 125 and BS 105 or whether the UL can be considered as operating under normal transmission.

One significant advantage of the improved DTX determination method and apparatus in accordance with the invention is that, if, based on said comparison of the normalized signal power of said at least one signal element or resource to said selected, calculated or predetermined threshold $\delta$, it is determined that a DTX state has indeed occurred then processing of said received UL channel signal to obtain any uplink control information (UCI) can be terminated. Advantageous results include that: a DTX determination is made with low latency of processing of the received UL channel signal even if said channel signal only comprises noise—this is especially useful in 5G NR URLLC applications; DTX determination is more efficient; and processing resources of the UCI data detection modules 260 are not needlessly wasted. Furthermore, the improved DTX determination method in accordance with the invention is generic to multiple LTE and 5G NR PUCCH Formats as will be more fully described hereinbelow.

The signal power of the at least one signal element or resource is preferably normalized to a standard normal distribution. Furthermore, in some embodiments, the signal powers of selected combinations of signal elements or resources are normalized and their normalized powers then combined in the optional power combination module 275 to provide a combined normalized power value which is passed to the DTX comparison and decision module 280 to compare said combined normalized power value to the selected, calculated or predetermined threshold $\delta$ from which a DTX determination is then made. The selected combinations of signal elements or resources may be selected from some or all of signal types, BS receive antennas, transmission resources (for LTE-A only) and frequency hops. The power of the a signal element or resource may be normalized with respect to noise variance of different BS receive antennas and/or the spreading factor for different signal types only where the UL channel signal is subject to de-spreading in the PUCCH receiver apparatus 100. The noise variance $\sigma^2$ may be obtained from a long-term evaluation of UL channel blocks but it will be understood that any suitable method of obtaining noise variance values may be implemented.

Figure 7:
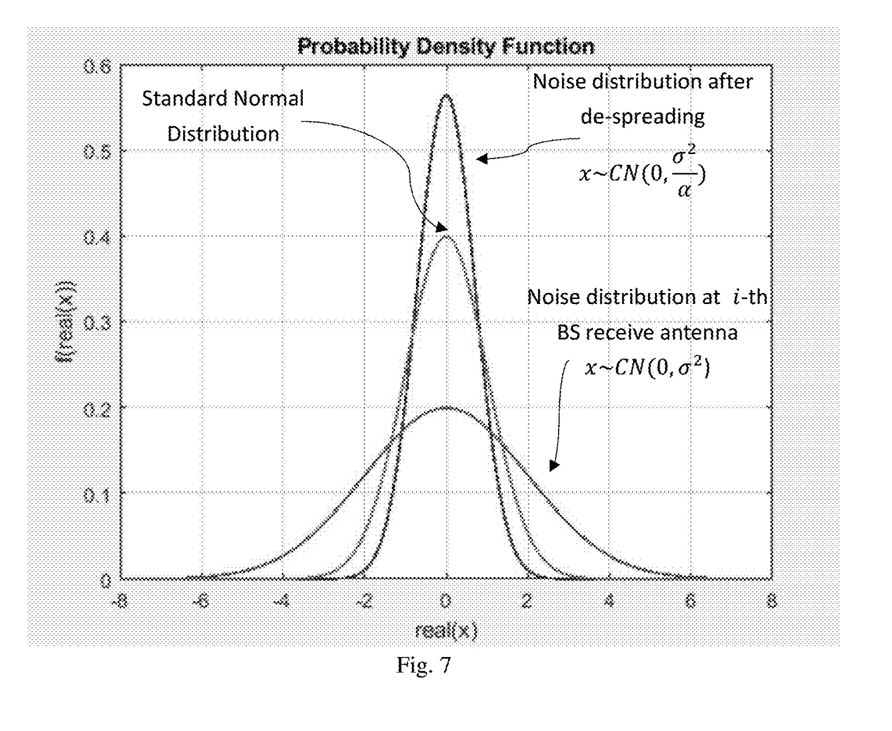
FIG. 7 illustrates the probability density function for the normalization of the noise power from different elements or resources to a standard normal distribution.
Figure 8:
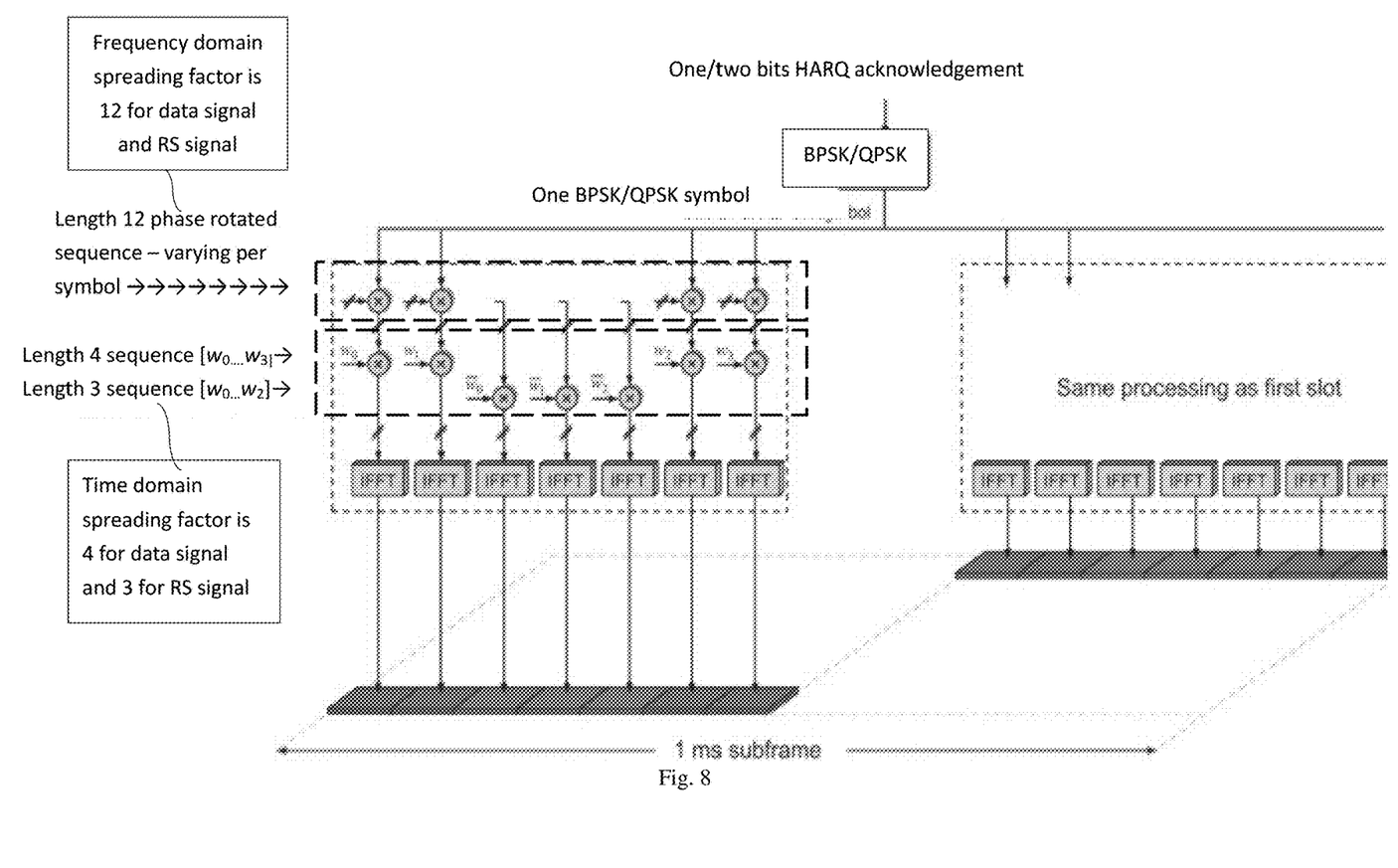
FIG. 8 illustrates spreading of the UL channel signal for LTE PUCCH Format 1 in a UE transmitter to derive the spreading factor.

Taking the case where the received UL channel signal is subject to de-spreading by the de-spreading module 230, FIG. 7 illustrates the probability density function for the normalization of the signal power from different elements or resources to a standard normal distribution. The normalized power for any resulting de-spreading outputs from the de-spreading module 230 is given by the equation:

$$P = \frac{|x|^2}{\frac{\sigma^2}{\alpha}} = \frac{\alpha \cdot |x|^2}{\sigma^2}$$

where x is the de-spreading output for any of, as appropriate, a data signal, an RS signal or a spreading sequence (only for 5G NR PUCCH Format 0) for a selected or specified BS receive antenna, frequency hop and transmit resource (only for LTE-A). $\sigma^2$ is the noise variance in the corresponding radio bearer of said receive antenna and a is the spreading factor in the current frequency hop. The final spreading factor $\alpha$ should take into account both the frequency and the time domain as illustrated in FIG. 8 for, by way of example only, LTE PUCCH Format 1. FIG. 8 illustrates spreading of the UL channel signal for LTE PUCCH Format 1 in a UE transmitter and, based on the transmitter scheme, to derive the spreading factor. Consequently, the method includes, where necessary, de-spreading a data signal, a reference signal (RS) and/or a spreading sequence for each HARQ/SR value in the RE demapped UL channel signal to provide de-spreading outputs for the data signal, the RS and/or the spreading sequence for each HARQ/SR value. Normalized powers for one or more of the de-spreading outputs from the de-spreading module 230 are provided by the power calculation and normalization module 270.

In some embodiments therefore, the method may include calculating normalized powers for a plurality of the de-spreading outputs in module 270 and then combining said normalized powers for at least some of said plurality of the de-spreading outputs in the power combination module 275. This provides a single combined normalization value which can be compared to the threshold δ in the DTX comparison and decision module 280 in order to make a DTX determination.

Combining the normalized power of some or all of the de-spreading outputs is given by the following equation and some or all of the normalized powers are selected for combining:

$$\tilde{P} = \sum_{i \in S_{rx}} \sum_{t \in S_{trsc}} \sum_{f \in S_{fh}} \sum_{\varepsilon \in S_{sig}} \sum_{n \in S_{op}} \overline{P}_{i,t,f}^{\varepsilon}(n)$$

where i comprises a receive antenna index;
t comprises a transmission resource index, where present;
f comprises a frequency hop index;
ε comprises a signal type;
n comprises a signal index for a selected signal type;
$S_{rx} \subseteq U_{rx}$, $U_{rx} = \{0, 1, \ldots, N_{rx}-1\}$ comprises a set of receive antennas;
$N_{rx}$ is the number of receive antennas;
$S_{trsc} \subseteq U_{trsc}$, $U_{trsc}$ comprises a set of transmission resources, if present;
$S_{fh} \subseteq U_{fh}$, $U_{fh}$ comprises a set of frequency hops;
$U_{sig} \subseteq U_{sig}$, $U_{sig} = \{$data signal, DMRS signal, spreading sequence, if present$\}$ comprises a set of signal types for de-spreading output signals;
$S_{op} \subseteq U_{op}$, $U_{op} = \{0, 1, \ldots, N_{i,t,f}^s - 1\}$ comprises a set of de-spreading outputs of signal type ε for receive antenna i, transmission resource t, frequency hop f, and
$N_{i,t,f}^s$ is the total number of signal elements in the specific resource.

Resources refer to receive antenna i, transmission resource t, frequency hop f, and signal type ε.

A selection of a combination of available signal elements or resources may be based on a degree of computational complexity in processing said selected combination, it being desirable to maintain an efficient level of computational complexity.

In the case of 5G NR PUCCH Format 0, it is preferred not to combine normalization powers to obtain a single combined normalization power but instead top use a maximum normalized power amongst normalized powers for some or all candidate HARQ/SR values. The maximum normalized power then passed to the DTX comparison and decision module 280 to be compared to the threshold δ and, based on the comparison result, making a determination of whether or not a DTX state has occurred.

Preferably, the pre-determined threshold δ for DTX detection comprises a theoretical threshold δ defined by the equation:

$$\delta = \beta \cdot \gamma^{-1}\left(N_e, (1 - P_{DTX})^{\frac{1}{N_{src}}}\right)$$

where $\gamma^{-1}(\cdot)$ comprises an inverse lower incomplete gamma function; and
$P_{DTX}$ is a probability that DTX has occurred and comprises one of: Pr(FA) where FA="false alarm", 2Pr(DTX→ACK) or Pr(DTX→TX);
$N_e$ comprises a number of combined signal elements or resources;
β comprises the adjust factor;
$N_{src}$ is given by:
(1) for NR PUCCH Format 0, it comprises a number of candidate HARQ-ACK/SR values: (i) $N_{src}=1$, where only SR is reported;
 (ii) $N_{src}=2$, where 1 bit ACK/NACK is reported;
 (iii) $N_{src}=4$, where 2 bit ACK/NACK or 1 bit ACK/NACK plus SR is reported;
 (iv) $N_{src}=8$, where 2 bit ACK/NACK plus SR is reported; or
(2) for all LTE PUCCH Formats and NR PUCCH Formats 1, 2, 3 and 4: $N_{src}=1$.

The foregoing leads to a probability of DTX defined by:

$P_{DTX} = 1 - [Pr(\tilde{P} \leq \delta)]^{N_{src}}$ where $Pr(\tilde{P} \leq \delta)]$ denotes the probability of $\tilde{P} \leq \delta$.

Consequently, a determination of DTX can be made when: $\tilde{P} \leq \delta$ for all PUCCH Formats except 5G NR PUCCH Format 0; and max$\tilde{P} = \delta$ for NR PUCCH Format 0, where maxP comprises a maximum normalized power amongst normalized powers for all candidate HARQ/SR values; otherwise normal transmission is determined.

Figure 9:
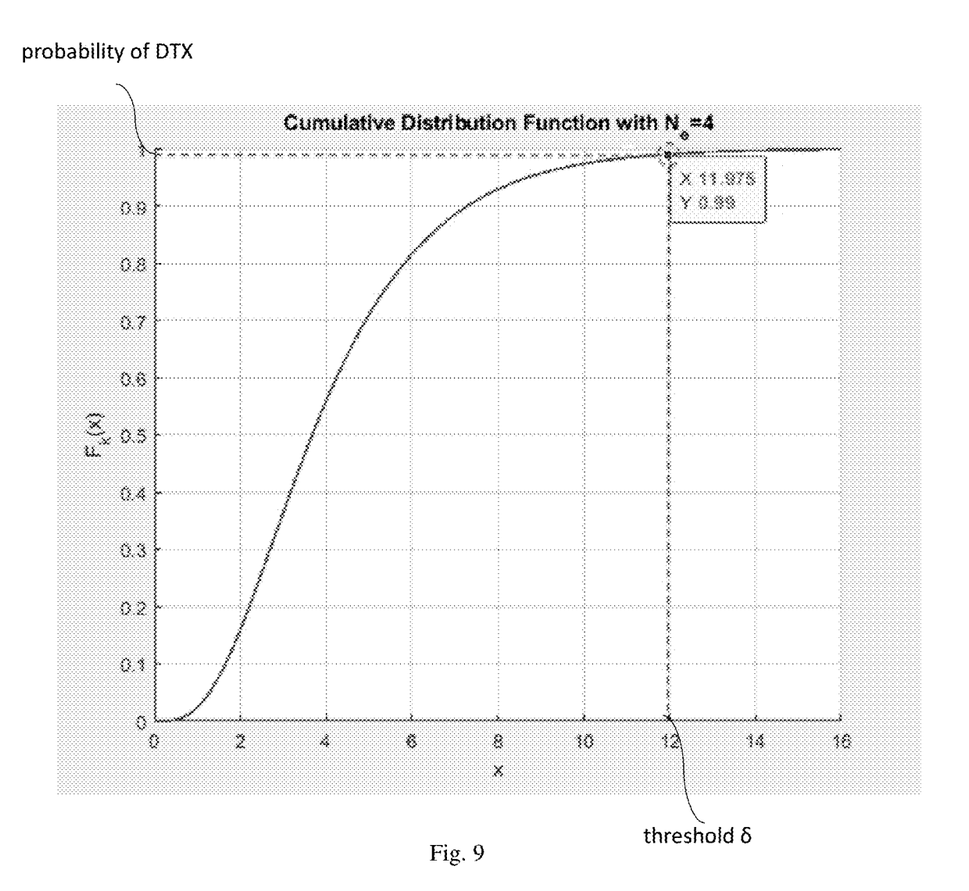
FIG. 9 is the cumulative distribution function for determination of the theoretical threshold δ.

For foregoing example of FIG. 8, the measure of theoretical threshold δ is illustrated by FIG. 9 which comprises a Chi-squared distribution:

$\tilde{P} \sim \chi^2(N_e)$

The present invention enables a selection of any combinations of available elements or resources based on computational complexity for both LTE and 5G NR.

The following scenarios apply to specified LTE and 5G NR PUCCH Formats.

For LTE Normal PUCCH Format 1/1a/1b for normal CP, calculating the normalized power for the de-spreading outputs can be applied to LTE Normal PUCCH Format 1/1a/1b for normal CP with $\alpha=48$ in the first and second frequency hop when x is the de-spreading output of the data signal, and $\alpha=36$ in the first and second frequency hop when x is the de-spreading output of the RS signal.

For LTE Normal PUCCH Format 1/1a/1b for extended CP, calculating the normalized power for the de-spreading output can be applied to LTE Normal PUCCH Format 1/1a/1b for extended CP with $\alpha=48$ in the first and second frequency hop when x is the de-spreading output of data, and $\alpha=24$ in the first and second frequency hop when x is the de-spreading output of the RS signal.

For LTE Shortened PUCCH Format 1/1a/1b for normal CP, calculating the normalized power for the de-spreading output can be applied to LTE Shortened PUCCH Format 1/1a/1b for normal CP with $\alpha=48$ in the first frequency hop and $\alpha=36$ in the second frequency hop when x is the de-spreading output of the data signal, and $\alpha=36$ in the first and second frequency hop when x is the de-spreading output of the RS signal.

For LTE Shortened PUCCH Format 1/1a/1b for extended CP, calculating the normalized power for the de-spreading output can be applied to LTE Shortened PUCCH Format 1/1a/1b for extended CP with $\alpha=48$ in the first frequency hop and $\alpha=36$ in the second frequency hop when x is the de-spreading output of the data signal, and $\alpha=24$ in the first and second frequency hops when x is the de-spreading output of the RS signal.

For LTE PUCCH Format 2/2a/2b for normal CP, calculating the normalized power for the de-spreading output can be applied to LTE PUCCH Format 2/2a/2b for normal CP with $\alpha=12$ in the first and second frequency hops when x is the de-spreading output of the data signal, and $\alpha=24$ in the first and second frequency hops when x is the de-spreading output of the RS signal.

For LTE PUCCH Format 2 for extended CP, calculating the normalized power for the de-spreading output can be applied to LTE PUCCH Format 2 for extended CP with $\alpha=12$ in the first and second frequency hops when x is the de-spreading output of the data signal, and $\alpha=12$ in the first and second frequency hops when x is the de-spreading output of the RS signal.

For LTE Normal PUCCH Format 3 for normal CP, calculating the normalized power for the de-spreading output can be applied to LTE Normal PUCCH Format 3 for normal CP with $\alpha=5$ in the first and second frequency hops when x is the de-spreading output of the data signal, and $\alpha=24$ in the first and second frequency hops when x is the de-spreading output of the RS signal.

For LTE Normal PUCCH Format 3 for extended CP, calculating the normalized power for the de-spreading output can be applied to LTE Normal PUCCH Format 3 for extended CP with $\alpha=5$ in the first and second frequency hops when x is the de-spreading output of the data signal, and $\alpha=12$ in the first and second frequency hops when x is the de-spreading output of the RS signal.

For LTE Shortened PUCCH Format 3 for normal CP, calculating the normalized power for the de-spreading output can be applied to LTE Shortened PUCCH Format 3 for normal CP with $\alpha=5$ in the first frequency hop and $\alpha=4$ in second frequency hop when x is the de-spreading output of the data signal, and $\alpha=24$ in the first and second frequency hops when x is the de-spreading output of the RS signal.

For LTE Shortened PUCCH Format 3 for extended CP, calculating the normalized power for the de-spreading output can be applied to LTE Shortened PUCCH Format 3 for extended CP with $\alpha=5$ in the first frequency hop and $\alpha=4$ in the second frequency hop when x is the de-spreading output of the data signal, and $\alpha=12$ in the first and second frequency hops when x is the de-spreading output of the RS signal.

For 5G NR PUCCH Format 0, calculating the normalized power for the de-spreading output can be applied for NR PUCCH Format 0 with $\alpha$ according to Table 1 below:

TABLE 1

| Number of symbols | Spreading factor $\alpha$ | |
|---|---|---|
| | No hopping | Hopping ($\alpha_1$, $\alpha_2$) |
| 1 | 12 | Invalid in Standard |
| 2 | 12 | 12, 12 |

For 5G NR PUCCH Format 1, calculating the normalized power for the de-spreading output can be applied for NR PUCCH Format 1 with $\alpha$. The spreading factor $\alpha$ for the data signal and the RS signal is according to Table 2 below:

TABLE 2

| Number of symbols | Spreading factor $\alpha$ for data signal | | Spreading factor $\alpha$ for RS signal | |
|---|---|---|---|---|
| | No hopping | Hopping ($\alpha_1$, $\alpha_2$) | No hopping | Hopping ($\alpha_1$, $\alpha_2$) |
| 4 | 24 | 12, 12 | 24 | 12, 12 |
| 5 | 24 | 12, 12 | 36 | 12, 24 |
| 6 | 36 | 12, 24 | 36 | 24, 12 |
| 7 | 36 | 12, 24 | 48 | 24, 24 |
| 8 | 48 | 24, 24 | 48 | 24, 24 |
| 9 | 48 | 24, 24 | 60 | 24, 36 |
| 10 | 60 | 24, 36 | 60 | 36, 24 |
| 11 | 60 | 24, 36 | 72 | 36, 36 |
| 12 | 72 | 36, 36 | 72 | 36, 36 |
| 13 | 72 | 36, 36 | 84 | 36, 48 |
| 14 | 84 | 36, 48 | 84 | 48, 36 |

For 5G NR PUCCH Format 2, calculating the normalized power for the de-spreading output can be applied for NR PUCCH Format 2 with $\alpha$. The spreading factor $\alpha$ is according to Table 3 below:

TABLE 3

| Number of symbols | Spreading factor $\alpha$ for data signal | | Spreading factor $\alpha$ for RS signal | |
|---|---|---|---|---|
| | No hopping | Hopping ($\alpha_1$, $\alpha_2$) | No hopping | Hopping ($\alpha_1$, $\alpha_2$) |
| 1 | 1 | Invalid in Standard | 1 | Invalid in Standard |
| 2 | 1 | 1, 1 | 1 | 1, 1 |

For 5G NR PUCCH Format 3, calculating the normalized power for the de-spreading output can be applied for NR PUCCH Format 3 with $\alpha=1$ when x is the de-spreading output of the data signal, and $\alpha=1$ when x is the de-spreading output of the RS signal.

For 5G NR PUCCH Format 4, calculating the normalized power for the de-spreading output can be applied for NR PUCCH Format 4 with $\alpha=N_{SF}^{PUCCH,4}$ when x is the de-spreading output of the data signal, and $\alpha=12$ when x is the de-spreading output of the RS signal and in which $N_{SF}^{PUCCH,4}$ is the length of an orthogonal cover code used in NR PUCCH Format 4.

The present invention also provides a PUCCH receiver apparatus comprising a memory storing machine-readable instructions and a processor for executing the machine-readable instructions such that, when the processor executes the machine-readable instructions, it configures the PUCCH receiver apparatus to implement the method in accordance with the invention.

The present invention also provides a non-transitory computer-readable medium storing machine-readable instructions, wherein, when the machine-readable instructions are executed by a processor, they configure a PUCCH receiver apparatus to implement the method in accordance with the invention.

The apparatus described above may be implemented at least in part in software. Those skilled in the art will appreciate that the apparatus described above may be implemented at least in part using general purpose computer equipment or using bespoke equipment.

Here, aspects of the methods and apparatuses described herein can be executed on any apparatus comprising the communication system. Program aspects of the technology can be thought of as "products" or "articles of manufacture" typically in the form of executable code and/or associated data that is carried on or embodied in a type of machine readable medium. "Storage" type media include any or all of the memory of the mobile stations, computers, processors or the like, or associated modules thereof, such as various semiconductor memories, tape drives, disk drives, and the like, which may provide storage at any time for the software programming. All or portions of the software may at times be communicated through the Internet or various other telecommunications networks. Such communications, for example, may enable loading of the software from one computer or processor into another computer or processor. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible non-transitory "storage" media, terms such as computer or machine "readable medium" refer to any medium that participates in providing instructions to a processor for execution.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A method of processing an uplink (UL) channel signal in a wireless communication system to determine a discontinuous transmission (DTX) state, the method comprising the steps of:
   receiving a UL channel signal at a Physical Uplink Control Channel (PUCCH) receiver apparatus;
   after resource element (RE) demapping of said received UL channel signal in said PUCCH receiver apparatus, normalizing a signal power of at least one signal element or resource;
   comparing said normalized signal power of said at least one signal element or resource to a selected, calculated or predetermined threshold; and,
   based on said comparison, determining whether or not a DTX state has occurred;
   wherein, if, based on a comparison of said normalized signal power of said at least one signal element or resource to said selected, calculated or predetermined threshold, it is determined that a DTX state has occurred then terminating processing of said received UL channel signal to obtain any uplink control information (UCI);
   wherein the step of terminating processing of said received UL channel signal to obtain any UCI data is implemented before equalization of the received UL channel signal in the PUCCH receiver apparatus.

2. The method of claim 1, wherein the signal power of said at least one signal element or resource is normalized to a constant level.

3. The method of claim 1, wherein the step of normalizing signal power of at least one signal element or resource is implemented before equalization or channel decoding of the received UL channel signal in the PUCCH receiver apparatus.

4. The method of claim 1, wherein the step of normalizing signal power of at least one signal element or resource is implemented before UCI data detection processing of the received UL channel signal in the PUCCH receiver apparatus.

5. The method of claim 1, comprising the steps of:
   where present, de-spreading a data signal, a reference signal (RS) and/or a spreading sequence for each HARQ/SR value in the RE demapped UL channel signal to provide de-spreading outputs for the data signal, the RS and/or the spreading sequence for each HARQ/SR value; and
   calculating a normalized power for one or more of the de-spreading outputs.

6. The method of claim 5, comprising the steps of:
   calculating a normalized power for a plurality of the de-spreading outputs;
   combining the normalized powers for at least some of said plurality of the de-spreading outputs;
   comparing the combined normalized power for at least some of said plurality of the de-spreading outputs to said selected, calculated or predetermined threshold; and,
   based on said comparison, determining whether or not a DTX state has occurred.

7. The method of claim 6, wherein combining the normalized power of some or all of the de-spreading outputs is given by the following equation and some or all of the normalized powers are selected for combining:

$$\tilde{P} = \sum_{i \in S_{rx}} \sum_{t \in S_{trsc}} \sum_{f \in S_{f_h}} \sum_{e \in S_{sig}} \sum_{n \in S_{op}} \tilde{P}^e_{i,t,f}(n)$$

where i comprises a receive antenna index;
t comprises a transmission resource index, where present;
f comprises a frequency hop index;
ε comprises a signal type;
n comprises a signal index for a selected signal type;
$S_{rx} \subseteq U_{rx}$, $U_{rx}=\{0, 1, \ldots, N_{rx}-1\}$ comprises a set of receive antennas;
$N_{rx}$ is the number of receive antennas;
$S_{trsc} \subseteq U_{trsc}$, $U_{trsc}$ comprises a set of transmission resources, if present;
$S_{fh} \subseteq U_{fh}$, $U_{fh}$ comprises a set of frequency hops;
$S_{sig} \subseteq U_{sig}$, $U_{sig}=\{$data signal, DMRS signal, spreading sequence, if present$\}$ comprises a set of signal types for de-spreading output signals;
$S_{op} \subseteq U_{op}$, $U_{op}=\{0, 1, \ldots, N_{i,t,f}^{\varepsilon}1\}$ comprises a set of de-spreading outputs of signal type ε for receive antenna i, transmission resource t, frequency hop f, and
$N_{i,t,f}^{\varepsilon}$ is the total number of signal elements in a specific resource comprising any of a receive antenna i, transmission resource t, frequency hop f, and/or signal type ε.

8. The method of claim 7, comprising selecting a combination of available signal elements or resources dependent on a level of computational complexity.

9. The method of claim 5, wherein, for 5G NR PUCCH Format 0, a maximum normalized power amongst normalized powers for all candidate HARQ/SR values is compared to said selected, calculated or predetermined threshold; and, based on said comparison, determining whether or not a DTX state has occurred.

10. The method of claim 5, wherein the normalized power for one or more of the de-spreading outputs is calculated based on a corresponding noise variance and a spreading factor for selected resources.

11. The method of claim 5, wherein the normalized power for the de-spreading outputs is given by the equation:

$$P = \frac{|x|^2}{\frac{\sigma^2}{\alpha}} = \frac{\alpha \cdot |x|^2}{\sigma^2}$$

where x is the de-spreading output for a data signal, an RS signal or a spreading sequence in a selected BS receive antenna, frequency hop and transmit resource, if present;
$\sigma^2$ is the noise variance in the corresponding radio bearer of said receive antenna; and
α is the spreading factor.

12. The method of claim 11, wherein the noise variance $\sigma^2$ is obtained from a long-term evaluation of other UL channel blocks.

13. The method of claim 5, wherein obtaining the predetermined threshold δ for DTX detection is defined by the equation:

$$\delta = \beta \cdot \gamma^{-1}\left(N_e, (1-P_{DTX})^{\frac{1}{N_{src}}}\right)$$

where $\gamma^{-1}(\cdot)$ comprises an inverse lower incomplete gamma function;
$P_{DTX}$ comprises one of: Pr(FA) where FA="false alarm", 2Pr(DTX→ACK) or Pr(DTX→TX);
$N_e$ comprises a number of combined signal elements or resources;
β comprises the adjust factor;
$N_{src}$ is given by:
(1) for NR PUCCH Format 0, it comprises a number of candidate HARQ-ACK/SR values: (i) $N_{src}=1$, where only SR is reported;
  (ii) $N_{src}=2$, where 1 bit ACK/NACK is reported;
  (iii) $N_{src}=4$, where 2 bit ACK/NACK or 1 bit ACK/NACK plus SR is reported;
  (iv) $N_{src}=8$, where 2 bit ACK/NACK plus SR is reported; or
(2) for all LTE PUCCH Formats and NR PUCCH Formats 1, 2, 3 and 4: $N_{src}=1$.

14. The method of claim 13, wherein a determination of DTX is made when:
$\tilde{P} \leq \delta$ for all PUCCH Formats except 5G NR PUCCH Format 0;
$\max\tilde{P} \leq \delta$ for NR PUCCH Format 0, where $\max\tilde{P}$ comprises a maximum normalized power amongst normalized powers for all candidate HARWSR values;
otherwise normal transmission is determined.

15. A Physical Uplink Control Channel (PUCCH) receiver apparatus in a wireless communication system, the PUCCH receiver apparatus comprising:
a memory storing machine-readable instructions; and
a processor for executing the machine-readable instructions such that, when the processor executes the machine-readable instructions, it configures the PUCCH receiver apparatus to determine a discontinuous transmission (DTX) state by implementing the steps of:
receiving a UL channel signal at said PUCCH receiver apparatus;
after resource element (RE) demapping of said received UL channel signal in said PUCCH receiver apparatus, normalizing a signal power of at least one signal element or resource;
comparing said normalized signal power of said at least one signal element or resource to a selected, calculated or predetermined threshold; and,
based on said comparison, determining whether or not a DTX state has occurred;
wherein, if, based on a comparison of said normalized signal power of said at least one signal element or resource to said selected, calculated or predetermined threshold, it is determined that a DTX state has occurred then terminating processing of said received UL channel signal to obtain any uplink control information (UCI);
wherein the step of terminating processing of said received UL channel signal to obtain any UCI data is implemented before equalization of the received UL channel signal in the PUCCH receiver apparatus.

16. A non-transitory computer-readable medium storing machine-readable instructions, wherein, when the machine-readable instructions are executed by a processor, they configure a Physical Uplink Control Channel (PUCCH) receiver apparatus in a wireless communications system to determine a discontinuous transmission (DTX) state in an uplink (UL) channel by implementing the steps of:
receiving a UL channel signal at said PUCCH receiver apparatus;
after resource element (RE) demapping of said received UL channel signal in said PUCCH receiver apparatus, normalizing a signal power of at least one signal element or resource;

comparing said normalized signal power of said at least one signal element or resource to a selected, calculated or predetermined threshold; and,
based on said comparison, determining whether or not a DTX state has occurred;
wherein, if, based on a comparison of said normalized signal power of said at least one signal element or resource to said selected, calculated or predetermined threshold, it is determined that a DTX state has occurred then terminating processing of said received UL channel signal to obtain any uplink control information (UCI);
wherein the step of terminating processing of said received UL channel signal to obtain any UCI data is implemented before equalization of the received UL channel signal in the PUCCH receiver apparatus.

* * * * *